US008144696B2

(12) United States Patent
Kallio et al.

(10) Patent No.: US 8,144,696 B2
(45) Date of Patent: Mar. 27, 2012

(54) MOBILE MANAGEMENT ENTITY OPERATING IN COMMUNICATIONS NETWORK AND SELECTION METHOD THEREFOR

(75) Inventors: Juha Matias Kallio, Vantaa (FI); Teuvo Juhani Koponen, Coppell, TX (US)

(73) Assignee: Nokia Siemens Networks Oy, Espoo (FI)

( * ) Notice: Subject to any disclaimer, the term of this patent is extended or adjusted under 35 U.S.C. 154(b) by 498 days.

(21) Appl. No.: 12/487,300

(22) Filed: Jun. 18, 2009

(65) Prior Publication Data

US 2010/0323695 A1    Dec. 23, 2010

(51) Int. Cl.
*H04L 12/403* (2006.01)
*H04W 4/00* (2009.01)
(52) U.S. Cl. ..................... 370/352; 455/435.2
(58) Field of Classification Search .................. None
See application file for complete search history.

(56) References Cited

U.S. PATENT DOCUMENTS

| | | | |
|---|---|---|---|
| 2005/0135348 A1* | 6/2005 | Staack | 370/353 |
| 2008/0161054 A1 | 7/2008 | Kallio et al. | |
| 2008/0305768 A1* | 12/2008 | Nylander et al. | 455/410 |
| 2009/0075669 A1* | 3/2009 | Franceschini et al. | 455/452.2 |
| 2010/0279691 A1* | 11/2010 | Dwyer et al. | 455/436 |
| 2010/0285797 A1* | 11/2010 | Ghai et al. | 455/426.1 |
| 2010/0290436 A1* | 11/2010 | Wang | 370/335 |
| 2010/0297979 A1* | 11/2010 | Watfa et al. | 455/404.1 |
| 2011/0080894 A1* | 4/2011 | Iwamura et al. | 370/331 |

OTHER PUBLICATIONS

3GPP TS 23.272 V8.4.0, 3rd Generation Partnership Project; Technical Specification Group Services and System Aspects; Circuit Switched Fallback in Evolved Packet System; Stage 2 (Release 8), Jun. 2009.
3GPP TS 23.401 V8.6.0, 3rd Generation Partnership Project; Technical Specification Group Services and System Aspects; General Packet Radio Service (GPRS) enhancements for Evolved Universal Terrestrial Radio Access Network (E-UTRAN) access (Release 8), Jun. 2009.
3GPP TS 23.402 V8.6.0, 3rd Generation Partnership Project; Technical Specification Group Services and System Aspects; Architecture enhancements for non-3GPP accesses (Release 8), Jun. 2009.
3GPP TS 29.118 V8.2.0, 3rd Generation Partnership Project; Technical Specification Group Core Network and Terminals; Mobility Management Entity (MME)—Visitor Location Register (VLR) SGs interface specification (Release 8), Jun. 2009.
3GPP TS 23.236 V8.0.0, 3rd Generation Partnership Project; Technical Specification Group Services and System Aspects; Intra-domain connection of Radio Access Network (RAN) nodes to multiple Core Network (CN) nodes (Release 8), Dec. 2008.

(Continued)

*Primary Examiner* — Hassan Phillips
*Assistant Examiner* — Eunsook Choi
(74) *Attorney, Agent, or Firm* — Staas & Halsey LLP

(57) ABSTRACT

A selection method implemented as an algorithm in a mobile management entity (MME) operating in a communications network. The method includes receiving a unique identifier of a subscriber operating within the network and determining, based on the unique identifier, whether the subscriber has full circuit switching fallback (CSFB) capability or has only packet switching (PS) capability. When it is determined that the subscriber has full CSFB capability, a mobile switching center server (MSS) is selected based on original tracking area matrices and/or tracking area identity-location area identity mapping defined in the 3rd Generation Partnership Project (3GPP). When it is determined that the subscriber has only PS capability, an MSS is selected from a group of MSSs having CSFB support only for short message service (SMS) delivery.

15 Claims, 4 Drawing Sheets

OTHER PUBLICATIONS

3rd Generation Partnership Project; Technical Specification Group Services and System Aspects; Circuit Switched Fallback in Evolved Packet System; Stage 2 (Release 9), 3GPP Standard; 3GPP TS 23.272, 3rd Generation Partnership Project (3GPP), Mobile Competence Centre ; 650, Route Des Lucioles ; F-06921 Sophia-Antipolis Cedex ; France, No. V9.0.0, Jun. 1, 2009, pp. 1-50, XP050363522, paragraphs [4.3.2.]-[5.2.]; figures 5.2-1.

Notification of Transmittal of the International Search Report and the Written Opinion of the International Searching Authority, or the Declaration issued in corresponding PCT application No. PCT/EP2010/058610.

Written Opinion of the International Searching Authority issued in corresponding PCT application No. PCT/EP2010/058610.

* cited by examiner

Existing MSS base with CSFB support

MOBILE MANAGEMENT ENTITY OPERATING IN COMMUNICATIONS NETWORK AND SELECTION METHOD THEREFOR

BACKGROUND

Description of the Related Art

Long Term Evolution (LTE) of Universal Mobile Telecommunications System (UMTS) Terrestrial Radio Access Network (UTRAN) and Evolved Packet Core (EPC) is a new packet switched only radio access and core architecture that has been standardized within the scope of 3rd Generation Partnership Project (3GPP) Release 8. System architecture of LTE/EPC has been defined in 3GPP TS 23.401 and TS 23.402. The goals for LTE include improving spectral efficiency, lowering costs, improving services, making use of new spectrum and refarmed spectrum opportunities, and better integration with other open standards. The architecture that will result from this is called Evolved Packet System (EPS) and comprises Evolved UTRAN (E-UTRAN) on the access side and EPC on the core side.

Major drivers for new radio access have much higher end user bitrates and lower latency as compared to other 3GPP defined packet switched (PS) only radio access technologies, such as High Speed Packet Access (HSPA), as well as flexible capability for use of different radio frequencies than in the currently available radio technology. Additionally, one notable difference to other 3GPP defined technologies is a lack of circuit switched (CS) capability to fully optimize radio for PS traffic.

3GPP TS 23.272 defines architecture for a circuit switched fallback (CSFB) solution that is based on re-use of the existing deployed CS domain for voice services. The main principle of this solution is to execute an EPS attachment procedure in such way that a combined location update and tracking area update are produced in order to attach a subscriber into both LTE/EPS for data services and to a mobile switching center (MSC) server (MSS) with a visitor location register (VLR) for voice services. This location update procedure is indirectly executed by a Mobility Management Entity (MME) via a new 3GPP Release 8 signaling gateways (SGs) interface that is a new requirement for both MMEs and the CS core network.

In CSFB, a voice call that terminates at a mobile phone is routed normally in CS networks until the call reaches the visited MSS that has an SGs interface toward MMEs of the LTE/EPS architecture. The visited MSS executes a paging procedure toward the MMEs, which eventually forward the call toward the mobile terminal. Based on the paging procedure indication, as well as measurements done by the mobile terminal, the mobile terminal will move into coverage of an overlapping GSM EDGE Radio Access Network (GERAN) or UTRAN radio access network that is capable of handling a CS voice call. Thereafter, paging response will be provided by a terminal via this new radio access to a corresponding MSS entity.

Mobile originated and terminated short message service (SMS) uses the same framework defined for the CSFB even though the actual SMS payload is transported within Non Access Stratum (NAS) signaling messages without performing actual fallback to legacy UTRAN/GERAN. SMS is a widely used service in today's mobile networks and if SMS delivery occurs by using fallback mechanism to legacy UTRAN/GERAN, it would degrade both the LTE/EPS and SMS service experience.

It is assumed that CSFB procedures will be required initially only for providing SMS bearer to LTE/EPS enabled data modem/laptops. This kind of requirement drives operators towards architectures that are cost efficient and simple to deploy, with minimum impact to the existing network. In other words, operators want to minimize additional investments to the CS network. Eventually, when PS/CS capable LTE/EPS terminals arrive on the market, operators may want to separate handling of PS-only data modems having CSFB support only for SMS delivery from those terminals that also support voice service through CSFB procedure.

Currently, based on 3GPP specifications, an MME makes the selection of an MSC Server (MSS) in a CS core network side based only on an LTE/EPS Tracking Area mapped to Location Area/MSS/VLR address where the SGs interface will be established. The problem is that if the operator has deployed the CSFB only for SMS in the first phase by using a small number of MSC (Server) elements in a centralized fashion and then still wants to have these elements dedicated for this purpose when PS/CS capable terminals with CSFB for voice arrive on the market, then additional features are required in MMEs to select a proper MSC (Server)/VLR for CSFB handling.

SUMMARY

Various embodiments of the described below selection method are used by a mobile management entity (MME) operating in a communications network. The method includes receiving a unique identifier of a subscriber operating within the network and determining, based on the unique identifier, whether the subscriber has full circuit switching fallback (CSFB) capability or has only packet switching (PS) capability. When the subscriber has full CSFB capability, a mobile switching center server (MSS) is selected based on tracking area identity-location area identity mapping defined in 3rd Generation Partnership Project (3GPP). When the subscriber has only PS capability, an MSS belonging to a predetermined group is selected.

Various embodiments of the described below method select a mobile switching center server (MSS) with a visitor location register (VLR) to which a location update procedure will be established for subscribers operating within a communications network. The method includes dividing unique identifiers of subscribers operating within the network into two groups, a first group representing subscribers having full circuit switching fallback (CSFB) capability and a second group representing subscribers having only packet switching (PS) capability, and receiving a unique identifier of a specific subscriber operating within the network. When the specific subscriber has a unique identifier belonging to the first group or a unique identifier that does not belong to either the first group or the second group, an MSS is selected based on tracking area identity-location area identity mapping defined in 3rd Generation Partnership Project (3GPP). When the specific subscriber has a unique identifier belonging to the second group, an MSS having CSFB support only for short message service (SMS) delivery is selected.

Various embodiments of the described below mobile management apparatus operating in a communications network include a receiving part configured to receive a unique identifier of a specific subscriber operating within the network and a selection part configured to select a mobile switching center server based on tracking area identity-location area identity mapping defined in the 3rd Generation Partnership Project when the specific subscriber has a unique identifier belonging to a first group representing subscribers having full circuit switching fallback capability, configured to select a mobile switching center server having circuit switching fallback support only for short message service delivery when the specific subscriber has a unique identifier belonging to a second group representing subscribers having only packet switching capability, and configured to select a mobile switching center server based on tracking area identity-location area identity mapping defined in the 3rd Generation Partnership Project when the specific subscriber.

The above embodiments are simply examples, and all embodiments of the present invention are not limited to these examples.

Additional advantages will be set forth in part in the description which follows, and, in part, will be obvious from the description, or may be learned by practice of the method described below.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE EMBODIMENTS

Figure 1:
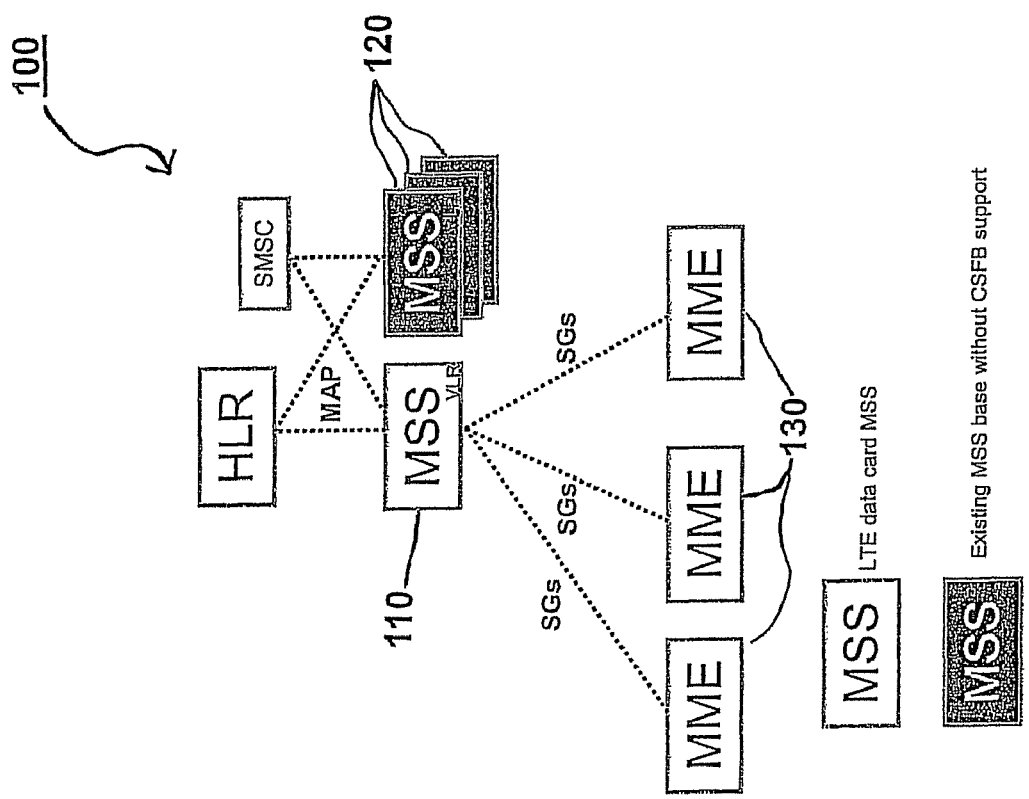
FIG. 1 is a block diagram of a communications network architecture in which CSFB for EPS is introduced into the network using a few MSSs for SMS delivery.

Reference will now be made in detail to the present embodiments, examples of which are illustrated in the accompanying drawings, wherein like reference numerals refer to like elements throughout.

FIG. 1 of the drawings illustrates a known communications network architecture 100 in which CSFB for EPS is introduced into the network using a few MSSs for SMS delivery purposes. The MSS/VLRs 110 are, for example, LTE data cards that have full CSFB capability, while the MSS/VLRs 120 are, for example, older generation servers without full CSFB support. In such an architecture, each MME 130 relies solely on the Tracking Area of each subscriber for determining the MSS/VLR to use for a location update procedure.

Figure 2:
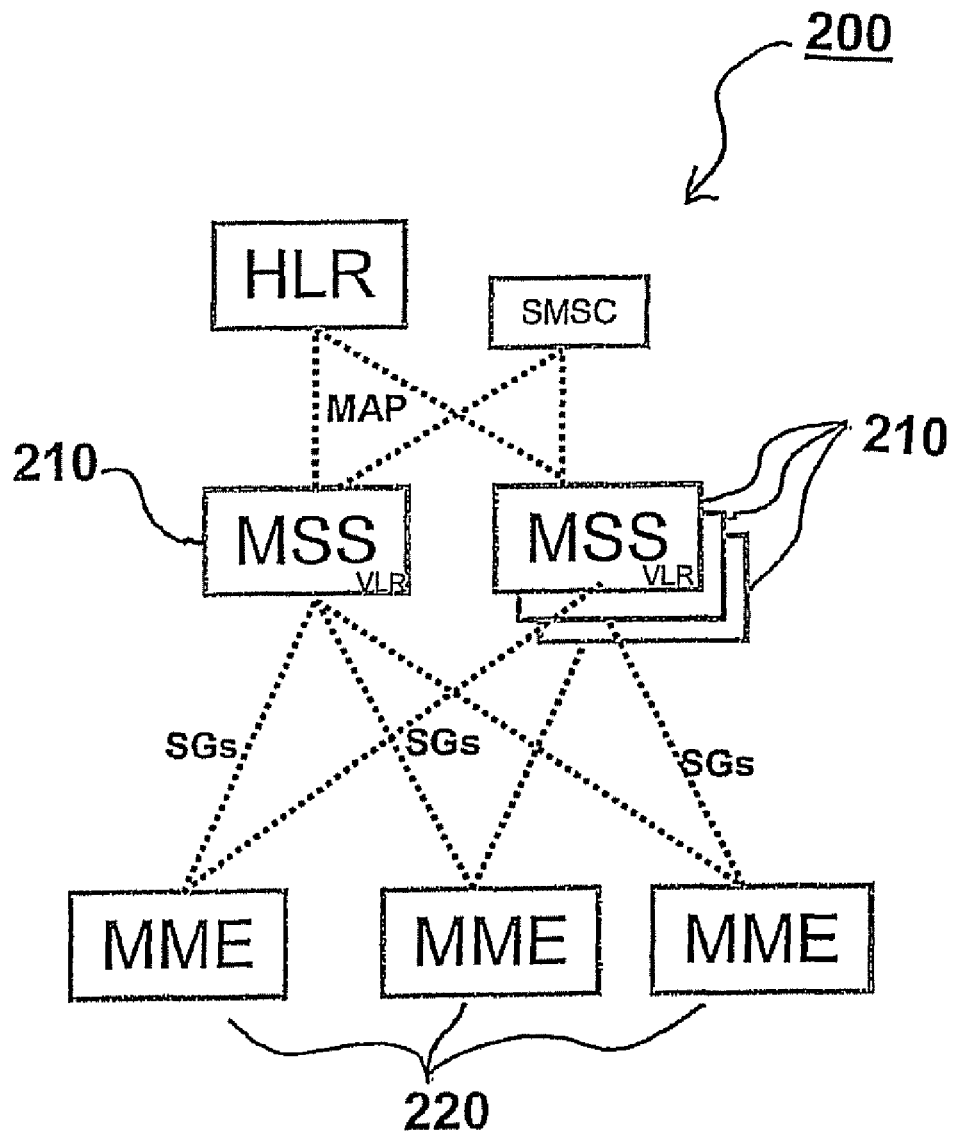
FIG. 2 is a block diagram of a communications network architecture in which CSFB for EPS is introduced into the network.
Figure 2:
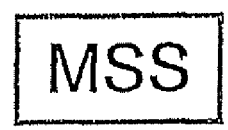

FIG. 2 of the drawings illustrates a known communications network architecture 200 in which CSFB for EPS is introduced into the network. The MSS/VLRs 210 are, for example, LTE data cards that have full CSFB capability. In such an architecture, each MME 220 relies solely on Tracking Area of each subscriber for determining the MSS/VLR to use for a location update procedure.

Figure 3:
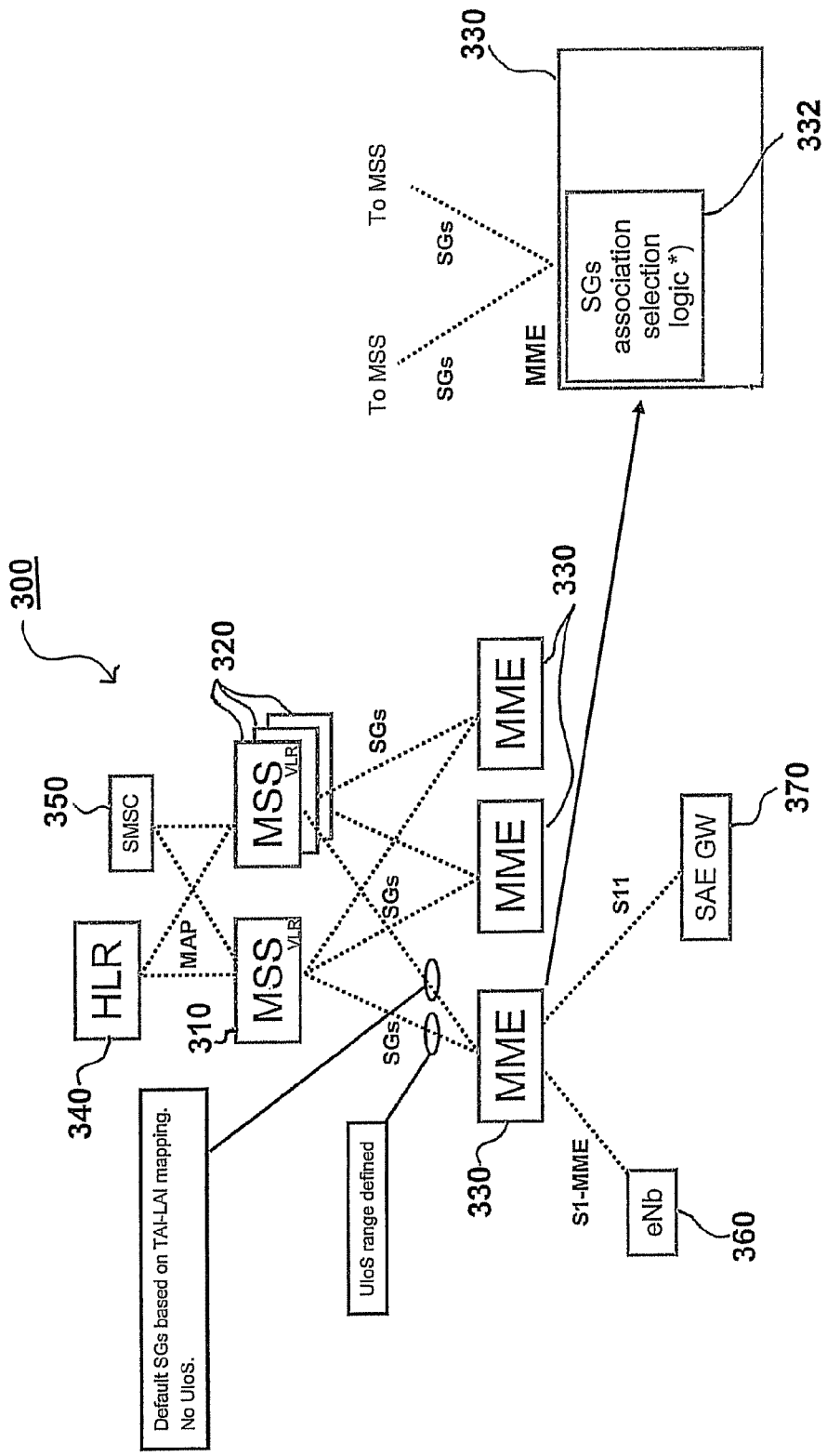
FIG. 3 is a block diagram of a communications network architecture.

FIG. 3 is an illustrative example of a communication system 300, in which an enhanced MSC Server (MSS)/Visitor Location Register (VLR) selection method (algorithm) is implemented. The communication system 300 includes one or more MSS/VLRs 310, one or more MSS/VLRs 320, one or more Mobility Management Entities (MMEs) 330, a Home Register Locator (HLR) 340 and a Short Messaging Service Center (SMSC) 350.

The HLR 340 is a central database that contains details of each subscriber that is authorized to operate within the core network. The HLR 340 is a system that directly receives and processes Mobile Application Part (MAP) transactions and messages from elements in the network, for example, the location update messages received as subscribers roam around. The HLR 340 connects to the MSS/VLRs 310 and 320 to handle requests from mobile terminals (subscribers) to attach to the network. The HLR 340 manages subscribers by updating the positions of the subscribers in tracking areas through a tracking area update procedure.

The SMSC 350 is a network element in the network that delivers SMS messages. When a subscriber sends an SMS message to another subscriber, the message gets stored in the SMSC 350, which then delivers the message to the destination subscriber when the subscriber is available. This is a store and forward option. Additional components of the communication system 300 include an evolved node B (eNb) 360 and a system architecture evolution gateway (SAE GW) 370 that communicate with the various MMEs 330.

The MSS/VLRs 310 and MSS/VLRs 320 are core network elements that control the network switching subsystem elements. Each VLR is a database associated with the MSS/VLRs 310 and MSS/VLRs 320 that stores information about all the mobile subscribers that are currently under the jurisdiction of the MSS that it serves. This information includes the current Location Area Identity (LAI) of each subscriber. The MSS/VLRs 310 are, for example, LTE data cards that have full CSFB capability, while the MSS/VLRs 320 are, for example, older generation servers without full CSFB support.

The MMEs 330 are the key control-nodes for the LTE access-network. The MMEs are responsible for selecting an MSS/VLR, from among the available MSS/VLRs 310 and 320, to which an update location procedure will be established for each subscriber within the network. Instead of merely relying on tracking area or tracking area identity-location area identity (TAI-LAI) mapping in selecting an MSS/VLR, each MME 330 is provided with a selection algorithm that takes into account additional attributes other than the tracking area of the subscribers and selects an MSS/VLR from among the available MSS/VLRs 310 and 320 based on the additional attributes.

The additional attributes that can be utilized by the algorithm of the MMEs 330 can include a unique identifier of subscriber (UIoS) of the subscriber that is the target for the CSFB. More specifically, this UIoS can be the International Mobility Subscriber Identity (IMSI) of the subscriber that is the target for the CSFB. Also, the International Mobile Equipment Identity (IMEI) of the subscriber can be used as the UIoS. For example, subscribers may be divided into specific IMSI ranges that are analyzed at the MME 330 when an MSS/VLR 310 or 320 is being selected to execute the location update procedure. The subscribers having the specific IMSI from a given range are assumed to have terminals that are only Short Message Service (SMS) capable. The subscribers from another range or no range are assumed to have terminals that have full PS/CS CSFB voice capability.

The MME 330 analyzes the IMSI of the subscriber to make a determination as to whether the IMSI belongs to one of a plurality of group ranges or no group range. The ISMI range groups include, for example, IMSIs belonging to subscribers having Short Message Service (SMS) only capabilities and IMSIs belonging to subscribers having full CSFB capabilities. The IMSI of the subscriber may be analyzed to determine that the IMSI does not belong into a configured IMSI range.

Thereafter, the MME 330 selects a signaling gateway (SGs) to an MSS/VLR 310 or 320 with the needed behavior based on the analysis of the IMSI of the subscriber. For example, the MSS/VLRs 320 may be dedicated to SMS handling and provide service for the packet-switched only terminals that are not voice capable, while the MSS/VLRs 310 may be dedicated to terminals requiring full CSFB capabilities.

As an example, an MME 330 may receive an IMSI of a subscriber operating within the network 300. The MME will then determine, based on the IMSI, whether the subscriber has full CSFB capability or has only PS capability. When it is determined that the subscriber has full CSFB capability, the MME 330 selects an MSS 310 or 320 (via the various SGs) based on original tracking area matrices or tracking area identity-location area identity (TAI-LAI) mapping defined in 3GPP. However, when it is determined that the subscriber has only PS capability, the MME 330 selects an MSS 320 having CSFB support only for short message service (SMS) delivery. This selection process may be carried out by a selection logic part 332 contained within the MME 330.

As a further example, an operator of the network may divide the IMSIs of the subscribers operating within the network into two or more groups, including a first group representing subscribers having full CSFB capability and a second group representing subscribers having only PS capability. Thereafter, upon an MME 330 receiving, at a receiving part, an IMSI of a specific subscriber operating within the network, a selection algorithm is implemented by the MME 330. This selection algorithm may be implemented within a selection logic part 332 of the MME 330, for example. The selection algorithm provides that, when the specific subscriber has an IMSI belonging to the first group or an IMSI does not belong to either the first group or the second group, for example, an MSS 310 or 320 is selected based on original tracking area matrices and/or tracking area identity-location area identity (TAI-LAI) mapping defined in 3GPP. However, when the specific subscriber has an IMSI belonging to the second group, the algorithm selects an MSS 320 having CSFB support only for short message service (SMS) delivery. It is also possible for the MME 330 performing the selection process to divide the IMSIs of the subscribers operating within the network into the two or more groups via the selection logic part 332.

Referring to FIG. 3, the desired number of subscribers (not shown) can be categorized according to their UIoS range (for example, one or more ranges may be categorized). The MMEs 330 have SGs associations with multiple MSSs within the communication system 300 and, therefore, some of these SGs will have a UIoS range defined within at least one MME 330. If a UIoS received at an MME 330 does not match a previously defined UIoS range, default SGs/VLR association may be carried out according to TAI-LAI mapping. On the other hand, if the UIoS received at an MME 330 does belong to a previous defined UIoS range, the MME 330 will use the SGs associated with the defined range regardless of TAI-LAI mapping.

Figure 4:
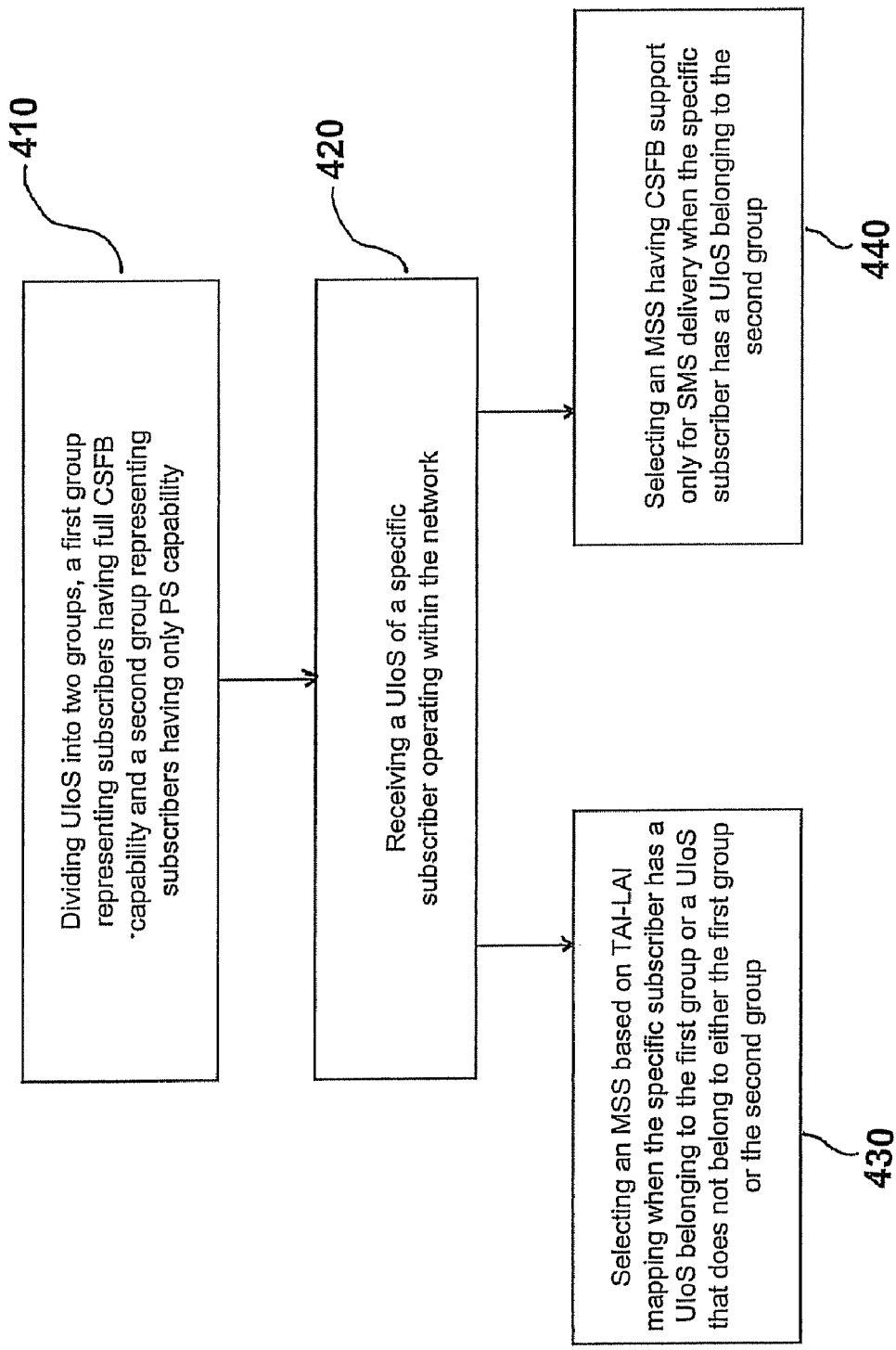
FIG. 4 is a flowchart illustrating a selection process.

FIG. 4 is an illustrative example of a selection process or algorithm carried out within the communication system 300 depicted in FIG. 3. This selection process can be performed within the MMEs 330 operating within the communication system 300 and, more specifically, may be carried out partially or wholly within the selection logic part 332 of the MMEs 330. In operation 410, the UIoS of the desired subscribers (for example, the subscribers operating within the network) are divided into two or more groups. As a non-limiting example, the two or more groups may include a first group representing subscribers having full CSFB capability and a second group representing subscribers having only PS capability. In operation 420, the MME receives a UIoS of a specific subscriber operating within the network. Following operation 420, the selection algorithm performs one of two further steps depending on the UIoS received in operation 420. When the specific subscriber has a UIoS belonging to the first group or a UIoS that does not belong to either the first group or the second group, operation 430 is carried out in which an MSS (a default MSS via the related SGs) is selected based on TAI-LAI mapping. However, when the specific subscriber has a UIoS belonging to the second group, operation 440 is carried out in which an MSS (via the related SGs) is selected based on the range of UIoS defined in the second group (for example, an MSS having CSFB support only for SMS delivery).

As such, this algorithm can help the operator to incrementally deploy CSFB capability into a network and have a pool of MSS/VLR network elements dedicated to SMS handling and to provide service for the PS-only terminals that are not voice capable. This additionally enables the operator to handle scaling of the network in a more intelligent and efficient manner because the addition of PS-only terminals will not consume VLR capacity of all MSC Servers in the network, but only those network elements that are within the pool.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A selection method for a mobile management entity operating in a communications network, the method comprising:
   receiving a unique identifier of a subscriber operating within the network;
   determining, based on the unique identifier, whether the subscriber has full circuit switching fallback capability or has only packet switching capability;
   when the subscriber has full circuit switching fallback capability, selecting a mobile switching center server based on tracking area identity-location area identity mapping defined in 3rd Generation Partnership Project; and when the subscriber has only packet switching capability, selecting a mobile switching center server belonging to a predetermined group.

2. The method according to claim 1, wherein the unique identifier is an International Mobile Subscriber Identity.

3. The method according to claim 1, wherein the unique identifier is an International Mobile Equipment Identity.

4. The method according to claim 1, wherein the network is an Evolved Universal Mobile Telecommunications System Terrestrial Radio Access Network.

5. The method according to claim 1, wherein the predetermined group of mobile switching center servers includes packet switching mobile switching center servers having circuit switching fallback support only for short message service delivery.

6. A method of selecting a mobile switching center server with a visitor location register to which a location update procedure will be established for subscribers operating within a communications network, the method comprising:

dividing unique identifiers of subscribers operating within the network into two groups, a first group representing subscribers having full circuit switching fallback capability and a second group representing subscribers having only packet switching capability;

receiving a unique identifier of a specific subscriber operating within the network;

when the specific subscriber has a unique identifier belonging to the first group or a unique identifier that does not belong to either the first group or the second group, selecting a mobile switching center server based on tracking area identity-location area identity mapping defined in 3rd Generation Partnership Project; and when the specific subscriber has a unique identifier belonging to the second group, selecting a mobile switching center server having circuit switching fallback support only for short message service delivery.

7. The method according to claim 6, wherein the unique identifiers are International Mobile Subscriber Identities.

8. The method according to claim 6, wherein the unique identifiers are International Mobile Equipment Identities.

9. The method according to claim 6, wherein the network is an Evolved Universal Mobile Telecommunications System Terrestrial Radio Access Network.

10. A mobile management apparatus operating in a communications network, the apparatus comprising:

a receiving part configured to receive a unique identifier of a specific subscriber operating within the network; and a selection part configured to select a mobile switching center server based on tracking area identity-location area identity mapping defined in the 3rd Generation Partnership Project when the specific subscriber has a unique identifier belonging to a first group representing subscribers having full circuit switching fallback capability, configured to select a mobile switching center server having circuit switching fallback support only for short message service delivery when the specific subscriber has a unique identifier belonging to a second group representing subscribers having only packet switching capability, and configured to select a mobile switching center server based on tracking area identity-location area identity mapping defined in the 3rd Generation Partnership Project when the specific subscriber has a unique identifier that does not belong to either the first group or the second group.

11. The apparatus according to claim 10, wherein the unique identifier is an International Mobile Subscriber Identity.

12. The apparatus according to claim 10, wherein the unique identifier is an International Mobile Equipment Identity.

13. The apparatus according to claim 10, wherein the network is an Evolved Universal Mobile Telecommunications System Terrestrial Radio Access Network.

14. The apparatus according to claim 10, wherein the predetermined group of mobile switching center servers includes packet switching mobile switching center servers having circuit switching fallback support only for short message service delivery.

15. A non-transitory computer-readable medium encoded with a computer program for selecting a mobile switching center server with a visitor location register to which a location update procedure will be established for subscribers operating within a communications network, the program when executed by a computer causes the computer to perform a method comprising:

dividing unique identifiers of subscribers operating within the network into two groups, a first group representing subscribers having full circuit switching fallback capability and a second group representing subscribers having only packet switching capability;

receiving a unique identifier of a specific subscriber operating within the network;

when the specific subscriber has a unique identifier belonging to the first group or a unique identifier that does not belong to either the first group or the second group, selecting a mobile switching center server based on tracking area identity-location area identity mapping defined in the 3rd Generation Partnership Project; and when the specific subscriber has a unique identifier belonging to the second group, selecting a mobile switching center server having circuit switching fallback support only for short message service delivery.

* * * * *